US007898981B1

(12) United States Patent
Tran et al.

(10) Patent No.: US 7,898,981 B1
(45) Date of Patent: Mar. 1, 2011

(54) SYSTEM AND METHOD FOR IMPROVING NETWORK PERFORMANCE BY CONTROLLING STUB-ROUTING BEHAVIOR

(75) Inventors: Thuan Van Tran, Cary, NC (US); Donald Earl Slice, Jr., Cary, NC (US); Liem H. Nguyen, San Jose, CA (US); Donnie Van Savage, Raleigh, NC (US); Yi Yang, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1324 days.

(21) Appl. No.: 11/394,587

(22) Filed: Mar. 31, 2006

(51) Int. Cl.
*H04L 12/28* (2006.01)
(52) U.S. Cl. .......................... 370/254; 370/401; 709/242
(58) Field of Classification Search .................. None
See application file for complete search history.

(56) References Cited

U.S. PATENT DOCUMENTS

| 5,331,637 | A | 7/1994 | Francis et al. | |
|---|---|---|---|---|
| 6,515,967 | B1 * | 2/2003 | Wei et al. | 370/244 |
| 7,042,834 | B1 * | 5/2006 | Savage | 370/218 |
| 7,069,343 | B2 * | 6/2006 | Goringe et al. | 709/249 |
| 7,200,122 | B2 * | 4/2007 | Goringe et al. | 370/255 |
| 7,334,047 | B1 * | 2/2008 | Pillay-Esnault | 709/242 |
| 7,742,431 | B2 * | 6/2010 | Ng et al. | 370/254 |
| 2004/0097235 | A1 * | 5/2004 | Siegel | 455/445 |
| 2007/0223701 | A1 * | 9/2007 | Emeott et al. | 380/270 |

OTHER PUBLICATIONS

"EIGRP Stub Routing", Cisco IOS Release 12.0(15)S, 11 pages.

* cited by examiner

*Primary Examiner* — Pankaj Kumar
*Assistant Examiner* — Marcus R Smith
(74) *Attorney, Agent, or Firm* — Fish & Richardson P.C.

(57) ABSTRACT

A system and method for enhancing the behavior of a network. In an illustrative embodiment, the network includes a distribution router and plural additional routers connected to the distribution router. The system includes a first module that is adapted to characterize the additional routers as stub routers or non-stub routers and then to provide a signal in response thereto. A second module selectively queries non-stub routers for route information and does not query stub routers for the route information. In a more specific embodiment, the second module includes a unicast module for selectively unicasting queries to the non-stub routers. A multicast module selectively multicasts queries to the non-stub routers via a modified conditional-receive algorithm.

16 Claims, 3 Drawing Sheets

SYSTEM AND METHOD FOR IMPROVING NETWORK PERFORMANCE BY CONTROLLING STUB-ROUTING BEHAVIOR

BACKGROUND OF THE INVENTION

This invention is related in general to networks and more specifically relates to digital networks and accompanying systems and methods for improving network performance and reliability.

Digital networks are employed in various demanding applications including military, university, and business applications. Such applications often demand reliable high-performance networks that are not easily destabilized when changes in network topology occur.

Systems for improving or optimizing network performance are particularly important in large networks, which often have many routers connected in various configurations that can lead to network inefficiencies. An exemplary network may exhibit hub-and-spoke topology, wherein a centralized distribution router, called the hub router, is connected to plural remote routers, called spoke routers, at the edge of the network. In such a network, the spoke routers may be connected to smaller networks, called end networks, that are not connected to other outside networks except through the hub router. Such spoke routers are often called stub routers. Certain routing protocols, such as Enhanced Interior Gateway Routing Protocol (EIGRP) employ a stub-routing feature to enhance network efficiency and stability in large hub-and-spoke networks employing large numbers of neighboring spoke routers.

In the exemplary network, Internet Protocol (IP) traffic passes through a hub router to the stub routers and to the end networks. The hub router may be further connected to the Internet or other network. A given hub router may be connected to hundreds of stub routers via one or more interfaces, called spoke or stub interfaces. For the purposes of the present discussion, a hub router may connect to plural stub routers at a single interface, called the stub interface of the hub router.

A stub router often does not provide the hub router with alternate routes to other parts of the network. Accordingly, a hub router employing a stub-routing feature will suppress route queries on stub interfaces between the hub router and stub routers to prevent multicast queries from the hub router from causing stuck-in-active scenarios. A stuck-in-active scenario occurs when a router query goes unanswered before the query is cancelled and resent by the sending router.

Furthermore, routers that are configured as stub routers must forward or bounce all non-local traffic to a hub router. Consequently, stub routers often lack complete routing tables. Generally, the hub router provides only default route information to a stub router.

Since route-sharing communications are limited on the stub interface between the hub router and accompanying stub routers, the stub interface can accommodate more stub routers than otherwise possible if the stub routers were not configured as stub routers. If a spoke router that is not configured as a stub router is connected to the hub router via a stub interface, the stub interface will then be treated as a non-stub interface. Consequently, the hub router will issue queries to the large numbers of stub routers via the stub interface, which may cause a query storm, clog the stub interface, destabilize the network, and prevent network convergence.

Accordingly, interfaces between hub routers and many stub routers are often excessively vulnerable to configuration mistakes. For example, accidentally configuring a spoke router as a non-stub router or adding a spoke router without first configuring the spoke router as a stub router could destabilize the network.

DETAILED DESCRIPTION OF EMBODIMENTS OF THE INVENTION

A preferred embodiment of the present invention implements a system for enhancing the behavior of a network. The system includes a distribution router and plural additional routers connected to the distribution router. A first module characterizes the additional routers as stub routers or non-stub routers and provides a signal in response thereto. A second module selectively queries the non-stub routers for route information and does not query stub routers for the route information. In a more specific embodiment, the second module selectively multicasts and/or unicasts queries to only non-stub routers via a modified conditional-receive algorithm.

Suppressing network route queries to stub routers in accordance with certain embodiments of the present invention may yield significant benefits, including reduced network traffic and reduced and packet processing on both hub routers and spoke routers, thereby enabling additional routers to be coupled to an interface. Hence, network-scaling capabilities are also enhanced.

For clarity, various well-known components, such as power supplies, communications ports, network cards, gateways, firewalls, Internet Service Providers (ISPs), switch consoles, and so on, have been omitted from the figures. However, those skilled in the art with access to the present teachings will know which components to implement and how to implement them to meet the needs of a given application.

Figure 1:
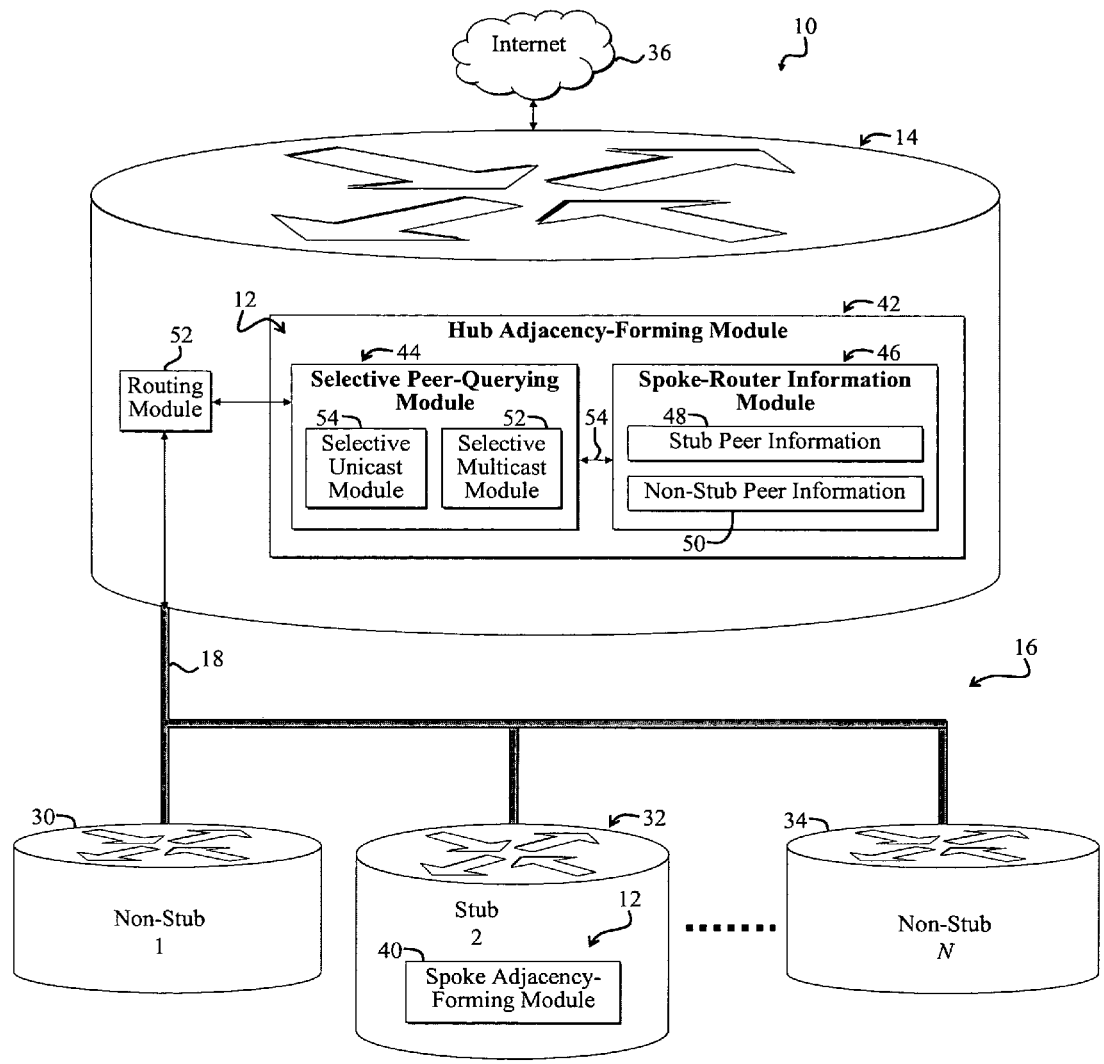
FIG. 1 is a diagram of an exemplary network employing a system for improving network performance according to a first embodiment of the present invention.

FIG. 1 is a diagram of an exemplary network 10 employing a system 12 for improving network performance according to a first embodiment of the present invention. The network 10 includes a distribution router, i.e., a hub router 14 that is connected to N spoke routers 16 in a hub-and-spoke Configuration. The N spoke routers 16 are connected to the hub router 14 via a shared spoke interface 18.

For illustrative purposes, the N spoke routers 16 are shown including a first non-stub spoke router 30, a second stub router 32, and an $N^{th}$ non-stub router 34, which are connected to the hub router 14 via the spoke interface 18. The hub router 14 is further connected to the Internet 36.

In the present specific embodiment, the system 12 for improving network performance is implemented via a first modified adjacency-forming module 40 running on the stub router 32 and a second modified adjacency-forming module 42 running on the hub router 14. The hub adjacency-forming module 42 includes a selective peer-querying module 44, which communicates with a spoke-router-information module 46, all of which are implemented on the hub router 14. The spoke-router-information module 42 maintains stub information 48 and non-stub information 50. The stub information 48 specifies which of the spoke routers 16 are stub routers, including how many of the spoke routers 16 are stub routers.

The non-stub information 50 specifies which of the spoke routers 16 are non-stub routers. The stub and non-stub information 48, 50 may include IP addresses associated with the spoke routers 16.

The hub adjacency-forming module 42 communicates with a routing module 52 in the hub router 14. The hub adjacency-forming module 42 communicates with the corresponding spoke adjacency-forming module 40 to facilitate forming adjacency relationships between the hub router 14 and the spoke routers 16.

For the purposes of the present discussion, a spoke router may be any router that is connected to an end network and that is not connected to any other network except through a distribution router, i.e., a hub router. An end network may be a network that is not connected to any other network except through the spoke router and a distribution router. A distribution router may be a router that is connected to one or more spoke routers. A stub router may be any spoke router that is configured, such as via a routing protocol like Enhanced Interior Gateway Routing Protocol (EIGRP), so that other routers, such as distribution routers, which are connected to the spoke router, do not send route queries to the stub router. A non-stub router is a router that is not a stub router.

For the purposes of the present discussion, a switch may be any device, module, software instruction, or other entity that can receive information and forward the information in a predetermined way, such as to a predetermined device address. Examples of switches include L2 switches, L3 switches, and routers.

A hybrid stub and non-stub interface may be an interface or a collection of interfaces between a distribution router and plural spoke routers, wherein some of the plural spoke routers are configured as stub routers, and some of the plural spoke routers are not configured as stub routers. Spoke routers that are not configured as stub routers are called non-stub routers. A router that is configured as a spoke router may be any router to which a distribution router suppresses route queries. Note that the routers 16 in FIG. 1 may include distribution routers and other types of routers in addition to or instead of spoke routers without departing from the scope of the present invention.

Conventionally, stub functionality is not deployed when plural hub routers are connected via a shared media, such as Ethernet. EIGRP typically only allows one router, i.e., the hub router, on an interface to not be a stub router. A second hub that is subsequently connected to the first hub cannot be configured as a non-stub router without potentially destabilizing the network or changing the configuration status of other spoke routers that are connected to the hub router.

When using an EIGRP stub routing feature, hub routers and spoke routers are configured to use EIGRP. Certain spoke routers may be configured as stub routers. Only certain specific routes are propagated from stub routers to hub routers. A stub router may responds to any queries for summaries, connected routes, redistributed static routes, external routes, and internal routes with the message inaccessible. A router that is configured as a stub router will send a special peer information packet to all neighboring routers to report its status as a stub router.

When routers are forming neighbor adjacency relationships, the transient state of a spoke router may be non-stub. Any discrepancy in stub accounting may result in the hub router treating the interface as a non-stub interface, thereby triggering a query storm. Certain embodiments of the present invention may enable a mixture of stub routers and non-stub routers to be connected on a shared interface. This is accomplished by selectively controlling how route queries are distributed to spoke routers connected on the interface based on the stub-status of the spoke routers as discussed more fully below.

Any neighboring router that receives a packet informing it of the stub status of the stub router that sent the packet will not query the stub router for any routes. Furthermore, a router that has a stub peer will not query that peer. The stub router will depend on the hub router to send the proper updates to all peers.

In operation, the hub adjacency-forming module 42 communicates with the spoke routers 16 to determine which of the spoke routers 16 are configured as stub routers and which are configured as non-stub routers. The resulting stub and non-stub information is maintained in the spoke-router-information module 46.

The selective peer-querying module 44 includes a selective-multicast module 52 and a selective unicast module 54, which implement routines for sending route queries only to non-stub spoke routers and/or for causing stub spoke routers, such as the stub router 32, to ignore route queries from the hub router 14.

By only communicating route queries from the hub router 14 to the non-stub routers 30, 34 of the spoke routers 16, the interface 18 may successfully act as a hybrid stub and non-stub interface. Consequently, the interface 18 is unlikely to be destabilized when a mix of non-stub and stub routers is connected to the hub router 14 via the interface 18.

The selective unicast module 44 selectively unicasts queries to non-stub routers 30, 34 when the numbers of non-stub routers connected to the hub router 14 via the interface 18 are below a predetermined number. The predetermined number is application specific. One skilled in the art may readily select an appropriate predetermined number for a particular network topology without undue experimentation.

When the numbers of non-stub routers connected to the hub router 14 via the interface 18 surpass the predetermined number, then the selective multicast module 52 and the spoke adjacency-forming module 40 may be employed to communicate route queries to only non-stub spoke routers 30, 34. The selective multicast module 52 and the spoke adjacency-forming module 40 implement a modified conditional-receive algorithm to communicate queries to non-stub spoke routers 16.

The modified conditional-receive algorithm or method includes employing the selective peer-querying module 44 to send a sequenced Time Length Value (TLV) hello command to the spoke routers 16. The hello command instructs only stub routers, such as the stub router 32, to discard or reject one or more subsequent multicast queries to be issued via the hub router 14. Non-stub routers will receive subsequent multicast queries. Hence, the interface 18 may act as a hybrid stub and non-stub interface.

The modified spoke adjacency-forming module 40 implements routines for ignoring or discarding multicast queries in response to a hello packet from the hub router 14 instructing the stub router 32 to ignore or discard the multicast queries. The adjacency-forming module 40 may also send stub-status information to the hub router 14 indicating whether the spoke router 32 is configured as a stub router or not.

Stub features implemented via the spoke adjacency-forming module 40 may be selectively disabled without departing from the scope of the present invention.

While the present embodiment is shown implemented via various modules, such as the selective peer-querying module 44, embodiments may be implemented via alterations to routing protocols, such as EIGRP routing protocols instead of separate modules, without departing from the scope of the present invention.

Those skilled in the art with access to the present teachings may readily modify EIGRP to facilitate communicating route queries only to non-stub routers that are connected to the hub outer 14 according to embodiments of the present invention.

The system 12 may be considered to be a system for enhancing network behavior, particularly, the behavior of stub interfaces when non-stub routers are connected to the interfaces. The system 12 is implemented via the network 10 and includes the distribution router 14 and plural spoke routers 16 that are connected to the distribution router 14. A first module 46 characterizes spoke routers as stub routers or non-stub routers and provides a signal 54 in response thereto. The selective peer-querying module 44 represents a second module 44, which queries non-stub routers 30, 34 for route information and does not query stub routers 40 for the route information.

The multicast module 54 is adapted to selectively multicast queries to the non-stub routers 30, 34. The selective peer-querying module 44 implements one or more routines 54 for causing the stub routers 40 to ignore multicast queries from the distribution router 14. The one or more routines 54 include instruction for employing a modified conditional-receive algorithm to transport multicast queries from the distribution router 14 to the spoke routers 16. The modified conditional-receive algorithm may implement instructions that are readable by non-stub spoke routers 30, 34 and that instruct the non-stub spoke routers 30, 34 to accept and process a subsequent multicast query. The modified conditional-receive algorithm is modified to not send unicast queries from the distribution router 14 to one or more of the stub routers 32.

While the present embodiment is discussed with respect to routers, other types of network switches, such as Level-3 (L3) switches employing EIGRP, may be employed to facilitate implementing embodiments of the present invention without departing from the scope thereof. Furthermore, while the present embodiment has been discussed with respect to routers employing EIGRP functionality, routers and/or switches employing other types of routing protocols may be employed to facilitate implementing embodiments of the present invention without departing from the scope thereof.

Figure 2:
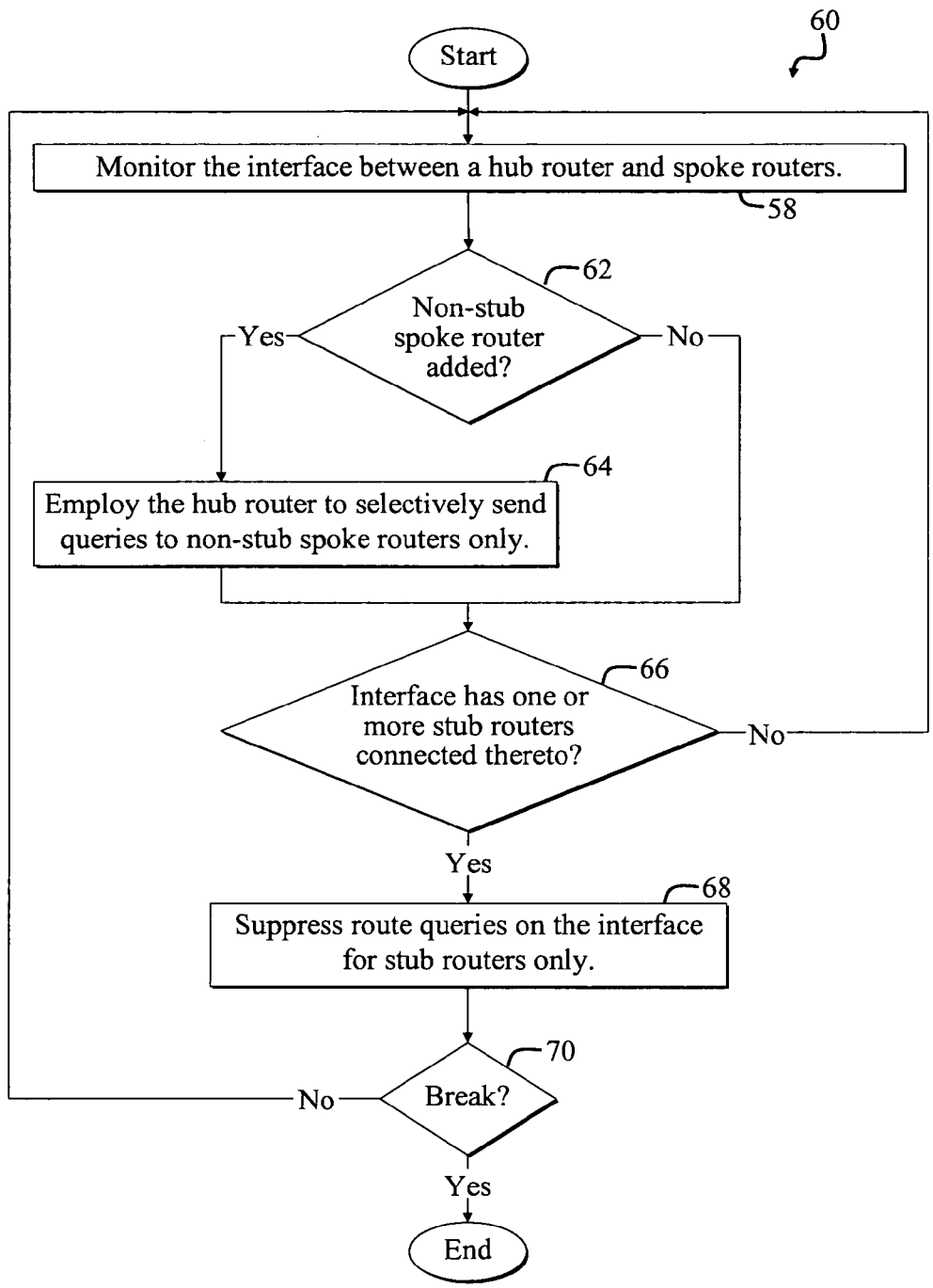
FIG. 2 is a flow diagram of a first method that is adapted for use with the system of FIG. 1.

FIG. 2 is a flow diagram of a first method 60 that is adapted for use with the network 10 and system 12 of FIG. 1. The method 60 includes an initial interface-monitoring step 58 wherein interface between a hub router and spoke routers is monitored. A subsequent non-stub-checking step 62 determines if a spoke router that is a non-stub router has been connected to the hub router via the interface.

If no non-stub routers have just been connected to the network, then a stub-checking step 66 is performed. Otherwise, if a non-stub router has just been connected to the hub router, then a querying step 64 is performed, wherein the hub router selectively sends queries to non-stub spoke routers. The stub-checking step 66 is performed after the querying step 64 or when the initial interface-monitoring step 58 determines that a non-stub router has been connected to the network.

The stub-checking step 66 determines whether a stub router is connected to network at an interface between the stub router and the hub router. If a stub router is connected to the network, then a selective query-suppressing step 68 is performed. Otherwise, the interface-monitoring step 58 continues.

The selective query-suppressing step 68 involves suppressing route queries on the interface between the hub router and connected spoke routers for spoke routers that are stub routers. Subsequently, a break-checking step 70 is performed.

The break-checking step 70 includes determining if a system break has occurred. A system break may occur when a hub router is turned off or when the selective peer-querying module 44 of FIG. 1 is disabled. If a break has occurred, the method 60 completes. Otherwise, the interface-monitoring step 58 continues.

Various steps of the method 60 may be omitted, reordered, or replaced with other steps without departing from the scope of the present invention.

Figure 3:
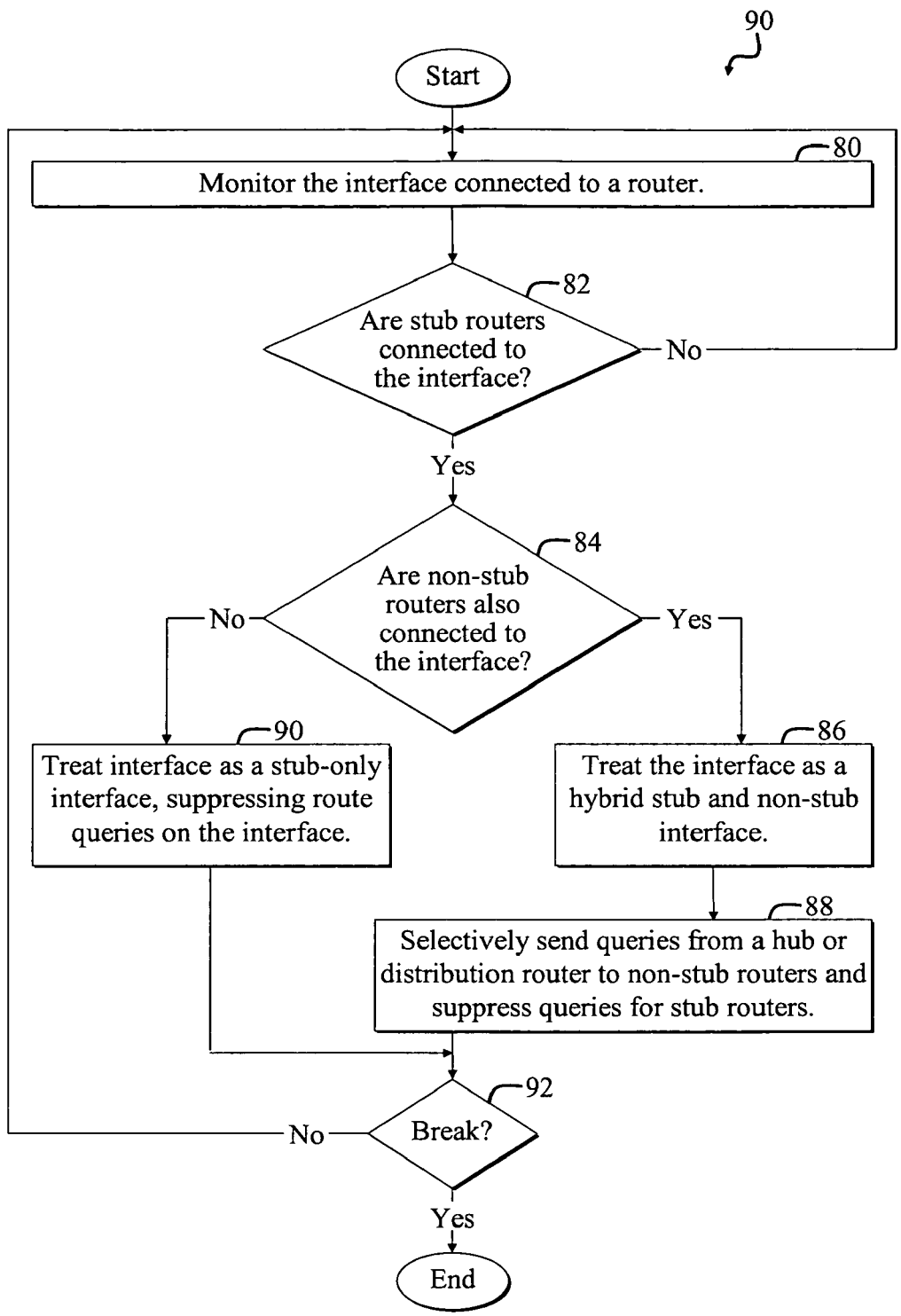
FIG. 3 is a flow diagram of a second method that is adapted for use with the system of FIG. 1.

FIG. 3 is a flow diagram of a second method 90 that is adapted for use with the network 10 and system 12 of FIG. 1. The method 90 includes an initial network-observing step 80, wherein an interface between a hub router and one or more spoke routers is observed.

A subsequent stub-checking step 82 determines if the network contains stub routers and/or switches. If the network does not contain stub routers and/or switches, the network-observing step 80 continues. Otherwise, a non-stub-checking step 84 is performed.

The non-stub-checking step 84 determines whether non-stub routers or switches are connected to the network, resulting in an interface that accommodates both stub and non-stub routers and/or switches. If the non-stub-checking step 84 determines that non-stub routers are also connected to the network, then a hybrid step 86 is performed. Otherwise, a stub-only step 90 is performed.

The hybrid step 86 involves treating the interface between the hub router and the spoke routers as an interface that connects to a mix of stub and non-stub routers and/or switches. Route queries are then sent from the hub to non-stub routers only in a subsequent selective query-sending step 88. Subsequently, a break-checking step 92 is performed.

The stub-only step 90 includes treating the interface between the hub router and/or switch as a stub-only interface, wherein route queries are suppressed on the interface. Subsequently, the break-checking step 92 is performed.

If the break-checking step 92 determines that a system break has occurred, then the method 90 completes. Otherwise, the monitoring step 80 continues.

With reference to FIGS. 2 and 3, the steps 64, 68 of FIG. 2 and steps 86, 88 of FIG. 90 employ a modified conditional-receive method to cause stub routers and/or switches connected to an interface to ignore, discard, or otherwise not respond to any multicast queries sent from the hub router and/or switch and destined for non-stub routers and/or switches only.

While the present embodiment is discussed with reference to systems and methods for facilitating the operation of networks exhibiting hub-and-spoke topology, embodiments of the present invention are not limited thereto. For example, networks exhibiting various topologies other than hub-and-spoke topologies may benefit from enabling routers to behave in specific different ways without disturbing the operation of neighboring routers in accordance with embodiments of the present invention.

Any acceptable architecture, topology, protocols, or other network and digital processing features can be employed with embodiments of the present invention. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "server," "peer," and so on), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
    a distribution router further comprising:
        a first module that characterizes additional routers connected to the distribution router as stub routers or non-stub routers and that provides a signal in response thereto, wherein a stub router is configured such that other routers do not send route queries to the stub router; and
        a second module that selectively queries the non-stub routers for route information and that does not query the stub routers for the route information based on the signal, wherein the second module includes a selective peer-querying module, wherein the selective peer-querying module includes instructions for selectively unicasting or multicasting queries from the distribution router to non-stub routers, and wherein the selective peer-querying module further includes instructions for multicasting a first set of instructions to the additional routers that instruct the stub routers to ignore or discard one or more subsequent multicast queries.

2. The system of claim 1 wherein the first set of instructions are readable by the non-stub routers, and wherein the first set of instructions instruct the non-stub routers to accept and process the one or more subsequent multicast queries from the distribution router.

3. The system of claim 1 wherein the second module includes a unicast module that selectively unicast queries to the non-stub routers.

4. The system of claim 1 wherein the second module includes a multicast module that selectively multicast queries to the non-stub routers.

5. The system of claim 4 wherein the second module implements one or more routines for causing the stub routers to ignore the multicast queries from the distribution router.

6. The system of claim 5 wherein the one or more routines include instructions for employing a modified conditional-receive algorithm to transport the multicast queries from the distribution router to the additional routers, and wherein the additional routers include spoke routers.

7. The system of claim 6 wherein the modified conditional-receive algorithm includes instructions for initially multicasting a hello packet to the additional routers, wherein the hello packet instructs the stub routers to discard one or more subsequent multicast queries from the distribution router.

8. The system of claim 7 wherein the hello packet includes instructions that are readable by non-stub routers that instruct the non-stub routers to accept and process a subsequent multicast query.

9. The system of claim 7 wherein the modified conditional-receive algorithm is modified to not send unicast queries from the distribution router to one or more of the stub routers.

10. The system of claim 1 wherein the first module includes a router-information module in communication with the distribution router.

11. The system of claim 10 wherein the stub routers and the distribution router include level-3 (L3) switches.

12. The system of claim 11 wherein the L3 switches include Enhanced Interior Gateway Protocol (EIGRP) functionality.

13. A system comprising:
    first means for characterizing spoke routers in a network as stub routers or non-stub routers, wherein a stub router is configured such that other routers do not send route queries to the stub router, the spoke routers being connected to a distribution switch via a first interface, and providing a signal in response thereto; and
    second means for selectively enabling the interface to act as a hybrid stub and a non-stub interface based on the signal, wherein the second module includes a selective peer-querying module, wherein the selective peer-querying module includes instructions for selectively unicasting or multicasting route queries from a distribution router to the non-stub routers, and wherein the selective peer-querying module further includes instructions for multicasting a first set of instructions to the spoke routers that instruct the stub routers to ignore or discard one or more subsequent multicast route queries.

14. An apparatus comprising:
    one or more processors; and
    a non-transitory machine-readable medium including instructions executable by the one or more processors for:
    characterizing connected routers in a network, which are connected to a distribution router via a first interface, as stub routers or non-stub routers, wherein a stub router is configured such that other routers do not send route queries to the stub router;
    selectively enabling the interface to act as a hybrid stub and a non-stub interface when the connected routers include both the stub routers and the non-stub routers;
    selectively unicasting or multicasting route queries from the distribution router to the non-stub routers; and
    multicasting a first set of instructions to the connected routers that instruct the stub routers to ignore or discard one or more subsequent multicast route queries.

15. A non-transitory machine-readable storage medium including instructions executable by a processor, the machine-readable storage medium comprising one or more instructions for:
    characterizing certain routers in a network, which are connected to a distribution via a first interface, as stub routers or non-stub routers, wherein a stub router is configured such that other routers do not send route queries to the stub router;
    selectively enabling the interface to act as a hybrid stub and a non-stub interface when the certain routers include both the stub routers and the non-stub routers;
    selectively unicasting or multicasting route queries from a distribution router to the non-stub routers; and
    multicasting a first set of instructions to the certain routers that instruct the stub routers to ignore or discard one or more subsequent multicast route queries.

16. A method comprising:

characterizing, by a computer, certain routers in a network, which are connected to a distribution via a first interface, as stub routers or non-stub routers, wherein a stub router is configured such that other routers do not send route queries to the stub router;

selectively enabling the interface to act as a hybrid stub and a non-stub interface when the certain routers include both the stub routers and the non-stub routers;

selectively unicasting or multicasting route queries from a distribution router to the non-stub routers; and multicasting a first set of instructions to the certain routers that instruct the stub routers to ignore or discard one or more subsequent multicast route queries.

* * * * *